US011810163B1

(12) United States Patent
Kalanadhabhatla et al.

(10) Patent No.: US 11,810,163 B1
(45) Date of Patent: Nov. 7, 2023

(54) E-INVOICE CUSTOMIZATION SYSTEM

(71) Applicant: Amazon Technologies, Inc., Seattle, WA (US)

(72) Inventors: Naga Bhimanadha Swamy Kalanadhabhatla, Bellevue, WA (US); Ayush Kumar, Kirkland, WA (US); Satya S. Mishra, Redmond, WA (US); Sumit Katyal, Bothell, WA (US); Chad Rupp, Austin, WA (US); Mani Krishna Venkata Reddy Krishna Guntamukkula, Bellevue, WA (US); Raghavendra Swaroop Nukala, Redmond, WA (US); Tarun Gangwani, Seattle, WA (US); Oloyede Olumide, Redmond, WA (US); Neha Goswami, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 313 days.

(21) Appl. No.: 17/101,678

(22) Filed: Nov. 23, 2020

(51) Int. Cl.
*G06Q 30/00* (2023.01)
*G06Q 30/04* (2012.01)
*G06Q 40/12* (2023.01)
*G06N 20/00* (2019.01)
*G06Q 30/0283* (2023.01)
*G06Q 50/26* (2012.01)

(52) U.S. Cl.
CPC ........... *G06Q 30/04* (2013.01); *G06N 20/00* (2019.01); *G06Q 30/0283* (2013.01); *G06Q 40/12* (2013.12); *G06Q 50/26* (2013.01)

(58) Field of Classification Search
CPC .......................... G06Q 30/04; G06Q 30/0633
See application file for complete search history.

(56) References Cited

U.S. PATENT DOCUMENTS

| 2014/0067633 | A1* | 3/2014 | Venkatasubramanian .................. G06Q 20/102 705/34 |
| 2015/0039983 | A1* | 2/2015 | Gibb ...................... G06F 16/958 715/206 |
| 2021/0319007 | A1* | 10/2021 | Guggilla ................ G06Q 10/20 |

OTHER PUBLICATIONS

Blanchard, Jérôme, Yolande Belaïd, and Abdel Belaïd. "Automatic generation of a custom corpora for invoice analysis and recognition." 2019 International Conference on Document Analysis and Recognition Workshops (ICDARW). vol. 7. IEEE, 2019.*

* cited by examiner

*Primary Examiner* — Kathleen Palavecino
(74) *Attorney, Agent, or Firm* — K&L Gates LLP

(57) ABSTRACT

Devices and techniques are generally described for generating customized invoice data. In some examples, first data describing invoice settings for a first entity may be received during a registration process. In various examples, a plurality of invoice customizations may be determined based on a similarity between the first data and historical invoice settings of other entities. In some examples, the customized invoice data comprising the plurality of invoice customizations may be generated. In at least some examples, the customized invoice data may be stored in non-transitory computer-readable memory.

20 Claims, 7 Drawing Sheets

◄ Go back to Purchasing System            300                         [ Cancel ]  [ Save ]

Customize E-invoice Settings

We've set your default settings to make it easier to set up e-invoicing. You can override these settings by entering different text or values into the fields.

312     314

Invoice   Credit Memo

Need help?
- Refer to our e-invoice setup and customization guide
- Coupa Support documentation
- Learn how to use cXML for communication of data

320

Header Level

Invoice cXML  Preview  Download

---

302                                                                                   304

From Credential Domain
This field is the supplier or sender's domain, unless you want it listed as something else.

NetworkID

```
<From>
    <Credential domain="NetworkId">
        <Identity>Entity1</Identity>
    </Credential>
</From>
```

---

To Credential Domain
This field is the buyer's domain, unless you want it listed as something else.

310    308

NetworkID  Change

```
<To>
    <Credential domain="NetworkId">
        <Identity>Amazon</Identity>
    </Credential>
</To>
```

---

Sender Credential Domain
This field is the supplier or sender's domain, unless you want it listed as something else.

NetworkID  Change

```
<Sender>
    <Credential domain="NetworkId">
        <Identity>Entity1</Identity>
    </Credential>
</Sender>
```

---

From Identity
This field is the supplier or sender's domain, unless you want it listed as something else.

Entity1  Change

```
<From>
    <Credential domain="NetworkId">
        <Identity>Entity1</Identity>
    </Credential>
</From>
```

FIG. 3

E-INVOICE CUSTOMIZATION SYSTEM

BACKGROUND

In various examples, particular entity may use software-based procurement, accounting, and financial systems. Each of these systems may be tailored and/or configured according to the particular implementations by the entity. However, invoices generated by suppliers and/or buyers that enter into transactions with the entity may be generated by different software that may not interface well with the procurement, accounting, and/or financial systems of the entity. Accordingly, the software systems of the entity may be unable to automatically ingest and/or process invoices due to incompatibilities existing between the invoice-generation systems and the entity's own invoice-processing software. In order to alleviate this issue, technical integration teams are deployed to manually configure e-invoice generation systems and/or the entity's invoice processing systems to conform to one another. For example, technical integration teams may build complex maps to support unique customizations required for automated ingestion by the entity's financial, procurement, and/or accounting systems.

BRIEF DESCRIPTION OF DRAWINGS

FIG. 3 is an example of a user interface that may be used as part of an e-invoice customization system, in accordance with various aspects of the present disclosure.

DETAILED DESCRIPTION

Figure 1:
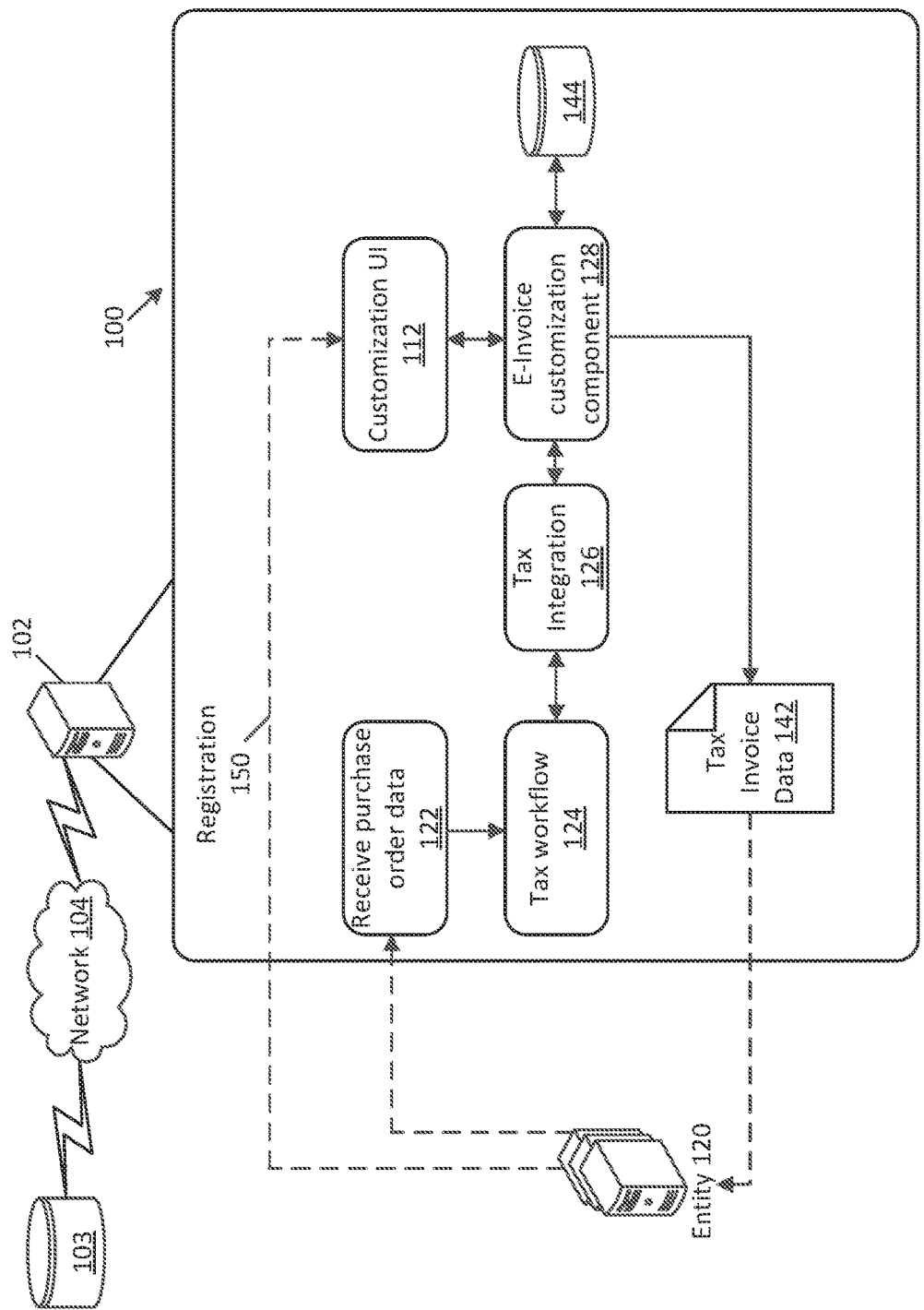
FIG. 1 is a block diagram illustrating an example e-invoice customization system, according to various embodiments of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Electronic Invoicing (E-Invoicing) refers to setting up a data transmission connection between an invoice generation system of an entity (e.g., a supplier) and an invoice-ingesting entity (e.g., a buyer/payee) to transmit electronic invoice data in an integrated electronic format from the invoice generating entity to the invoice recipient entity. E-Invoicing enables business buyers to receive structured invoice and tax data for their purchases/accounts in a machine-readable format electronically transmitted to the entity's eProcurement and/or reconciliation system of choice. In order to avoid cumbersome manual entry of invoice data (which may be generated in high volumes), in some examples, invoices are generated in a specific format that can be automatically parsed by software deployed by the e-invoice recipient and used to populate appropriate fields in the recipients eProcurement, reconciliation, and/or other financial software. In other examples, specific software may be deployed by the invoice recipients that is effective to parse the particular invoices received in order to transform the data into a form that can be used to automatically populate the fields of the back-end financial systems used by the recipient. Of course, another option is manual entry of each invoice using manual data entry.

The technical integration for automated e-invoicing in the business-to-business industry generally takes several weeks driven by manual technical discovery process and diverse buyer specific customization needs. These customizations help invoice recipients reconcile their e-invoices through procurement, accounting, and/or other financial systems. Both the generator of the invoice and the invoice recipient organizations may conduct offsite meetings including technical, procurement, and accounts payable personnel for the technical discovery and integration of the e-invoice generation and e-invoice recipient systems. The technical integration teams from e-invoice generators and e-invoice recipients may jointly determine the e-invoice recipient's e-invoice formatting and/or other requirements based on how their eProcurement and backend financial systems are set up. The e-invoice generator may implement the customizations at their end. In some examples, e-invoice generation teams may build custom maps to support unique customizations that e-invoice recipients may need in order to automatically ingest and process e-invoices in a business-to-business environment. These custom maps can take up to several weeks to create, test, and deploy for each e-invoice recipient, and may extend the duration of the integration. Such maps also add operational burden to the integrations team in terms of maintainability, and can potentially introduce tech debt for both integrations and software engineering teams. E-Invoice formats also vary by region with different customization requirements in tax-regulated countries increasing the variability in technical integration time.

Described herein is a self-serve e-invoice customization service that may be used by e-invoice recipients to control the customizations applied during generation of e-invoices by an e-invoice generating entity. The self-serve e-invoice customization service is automated and may be used by e-invoice recipient entities without requiring assistance from the e-invoice generating entity. The e-invoice customization techniques described herein are simple, user friendly, and designed not just for system integrators, but anyone with basic procurement experience. The customization service uses machine learning approaches to learn from historical customization data and may display a predicted list of customization fields that are relevant to each customer, thereby eliminating the need for customers to choose and apply customizations from a universal set. The various techniques described herein may also auto-populate default customization field values that the e-invoice recipient entity can easily modify/override in favor of their preferred customization settings. In various examples, the E-Invoice customization techniques described herein are innovative and provide an intuitive self-service solution that enables business consumers to customize the way electronic invoices are generated and/or formatted. The various techniques described herein may automate manual e-invoice customization in the business-to-business industry where integration consultants currently charge business buyers for manual implementation. With this, e-invoice recipients (e.g., buyers) do not have to invest in technical resources to implement e-invoice customizations. Instead, such customizations can be accomplished by account administrators with no in-depth technical knowledge in e-invoice formats. Additionally, following implementation, no manual invoice entry may be required when using the e-invoice customization systems described herein. Additionally, the time required for integration testing may be drastically reduced. Thereafter, electronic invoice data may be automatically generated in the customized format.

In some embodiments discussed herein, a machine learning (ML) model for invoice customization prediction is described. In some embodiments, the machine learning model can recommend a list of customizations most likely to be applicable to a newly-registered entity based on information about the entity and/or systems used by the entity.

In various examples, feature data may be computed representing various aspects and/or metadata related to the invoice customizations specified during recipient registration. The feature data may be combined into a customization profile (e.g., combined feature data representing the received invoice requirements/settings in a multi-dimensional embedding space). The customization profile may be input into the machine learning model, which may be trained using historical invoice settings data. The machine learning model may determine the K closest historical invoice settings in the multi-dimensional embedding space. In various examples, the historical invoice settings that are most similar to the customization profile (e.g., as determined using cosine similarity, Euclidean distance, etc.) may be predicted as the appropriate e-invoice customization settings for the current entity. The predicting customization settings may be displayed to the entity using a user interface. However, the entity may override the predicted customization settings displayed on the user interface by selecting, other, different settings and/or by providing an override input. Signals representing the override input for a particular setting may be used to re-train and improve the machine learning model used to predict customized invoice settings for entities during registration.

In various examples, the machine learning approach used to determine the closest K historical invoice data to the customization profile for the entity may use a nearest neighbor algorithm based on various features representing such things as a specified file format, a software type (e.g., a name of the entity's backend financial software), a software version, a name of the entity's procurement software, a version number, etc. Thereafter, for each e-invoice customization (e.g., of a set of all possible e-invoice customizations) a binary classifier may be used to predict whether or not to apply the particular customization (e.g., the particular e-invoice customization setting) for the current entity based on the similarity of the customization profile for the entity with previously-registered historical invoice settings of other, different entities.

Machine learning techniques, such as those described herein, are often used to form predictions, solve problems, recognize objects in image data for classification, etc. For example, herein machine learning techniques may be used to determine the most similar accounts to incoming entity data in a multi-dimensional feature space. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learned models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between expected output of the machine learning model and actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation.

Generally, in machine learning, an embedding is a mapping of a discrete, categorical variable to a vector of continuous numbers. In neural networks, embeddings are sometimes of lower dimensions relative to the data that the embeddings represent. In various examples, token embeddings may be generated to represent various data representing invoice attributes (e.g., settings, file formats, version numbers, software types, etc.) described herein for input into the various machine learning models described herein.

FIG. 1 is a block diagram illustrating an example e-invoice customization system 100, according to various embodiments of the present disclosure. In various examples, one or more computing devices 102 may receive purchase order data from an entity 120 (e.g., a procurement system of a customer). Entity 120 may initially register with computing devices 102 to specify various invoice customizations for invoices generated for the entity 120 for automatic ingestion of the invoices into various back-end systems of entity 120 (e.g., accounting software, procurement software, etc.). After registration (described in further detail below), computing devices 102 may be configured to automatically generate e-invoices in response to purchase order data received from the entity 120. The automatically-generated e-invoices may conform to the specifications predicted for and/or selected by the entity 120 during registration 150.

Computing devices 102, and/or computing devices used by entity 120 may communicate with one another and/or with one or more of the other components depicted in FIG. 1 over a network 104 (e.g., a local area network (LAN) and/or a wide area network (WAN) such as the internet). For example, computing device 102 and/or entity 120 may communicate with a non-transitory computer-readable memory 103 over network 104. In various examples, the non-transitory computer-readable memory 103 may store instructions that, when executed by at least one processor of the computing devices 102, may cause the computing devices to perform one or more of the electronic invoice customization techniques described herein.

Initially, entity 120 (e.g., a customer, buyer, and/or entity entering into a transaction with an entity associated with e-invoice customization system 100) may register with the e-invoice customization system 100 using registration 150. In various examples, registration 150 may occur through entity 120 navigating (e.g., using a web browser) to a user interface (UI) (e.g., customization UI 112) effective to allow the entity 120 to input data describing invoice settings for the entity 120. The invoice settings may describe requirements of the back-end software systems of entity 120 for automatic ingestion of e-invoice data. For example, the invoice settings may describe software version numbers, software names/types, file formats, data fields of the invoice, etc. In various examples, the customization UI 112 may pose a number of questions to the entity 120 during registration 150. For example, the customization UI 112 may ask what kind of e-procurement system the entity 120 uses, may ask what country the entity 120 is operating in, what file format (e.g., cXML, X12, etc.). Although the examples described herein typically describe customization of invoices, it may be appreciated that the various techniques described herein are equally applicable to credit memos and/or to other types of automatically-generated documents.

An example of a portion of customization UI 112 is depicted in FIG. 3 and described below. In various examples, after specification of the invoice settings by entity 120, the e-invoice customization component 128 may determine a customization profile for the entity 120. The e-invoice customization component 128 may thereafter determine the most similar customization profile (e.g., a historical customization profile with similar invoice settings) from among a plurality of historical invoice settings of other entities. In various examples, a machine learning algorithm may be used to generate a multi-dimensional vector representing entity 120's customization profile. Thereafter, the machine learning algorithm may determine the most similar customization profile from historical invoice settings stored in data store 144. The historical invoice settings may be associated with previously-registered entities. For example, e-invoice customization component 128 may use kNN and/or some other nearest neighbor algorithm and/or clustering algorithm to determine the most similar historical invoice settings stored in data store 144.

Thereafter, e-invoice customization component 128 may predict and display invoice customizations for the entity 120 during registration on customization UI 112. During registration, a person reviewing the registration process (e.g., an engineer, procurement manager, information technology professional, etc.) for entity 120 may accept or override the various predicted invoice settings for the entity 120. As previously-described, the predicted invoice settings may be the e-invoice customizations for the historical invoice settings determined to be most similar to the invoice settings supplied by entity 120 during registration 150.

After registration 150, entity 120 may send a purchase order (e.g., to purchase some good and/or service from an entity associated with e-invoice customization system 100). E-invoice customization system 100 may receive purchase order data from entity 120 at action 122. E-invoice customization system 100 may initially process the purchase order by shipping the subject goods, performing the requested services, etc. Additionally, the purchase order may be subjected to a tax workflow 124. The tax workflow 124 may determine the applicable tax and may apply the applicable taxes to the purchase order. For example, the particular tax jurisdiction and/or type of goods or services may affect the tax rate. The tax workflow 124 may determine the appropriate taxes for the purchase order.

Tax workflow 124 may send data representing the purchase order, shipment, services, etc., to tax integration 126. For example, tax workflow 124 may send raw data representing item(s) shipped, price, shipping charges, taxes, discounts, regulatory taxes, etc., to tax integration 126. Tax integration 126 may transform such data into a form that can be ingested by e-invoice customization component 128 and may generate a non-customized e-invoice including the tax data. E-invoice customization component 128 may determine identifier data included in the data received from tax integration 126 and/or from the purchase order data received at action 122. The identifier data may identify entity 120 from among other entities and may be used to lookup the invoice customizations for entity 120 stored in the data store 144 during registration 150.

E-invoice customization component 128 may apply the invoice customizations retrieved from data store 144 to the current e-invoice generated by tax integration 126 to generate customized tax invoice data 142. The customized tax invoice data 142 may include the customizations specified by entity 120 during registration 150. Accordingly, the customized tax invoice data 142 may be automatically ingested and/or processed by the applicable back-end systems of entity 120.

Figure 2:
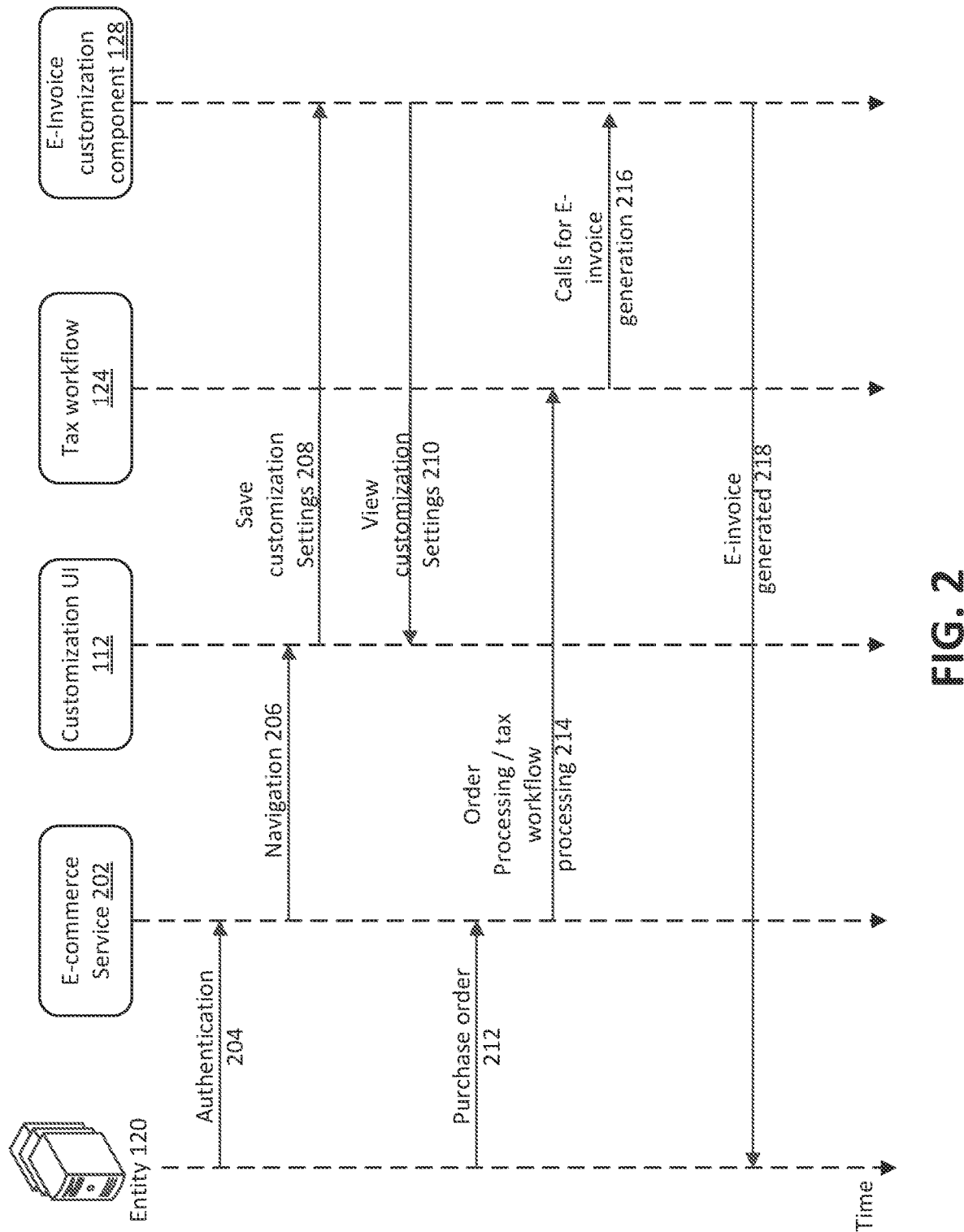
FIG. 2 is a timing diagram depicting additional details of the e-invoice customization system of FIG. 1, in accordance with various aspects of the present disclosure.

FIG. 2 is a timing diagram depicting additional details of the e-invoice customization system of FIG. 1, in accordance with various aspects of the present disclosure. Initially, entity 120 may be authenticated at authentication 204 (e.g., by logging into an e-commerce service 202). In the example depicted in FIG. 2, e-commerce service 202 may comprise the e-invoice customization system 100. In various examples, authentication 204 may associate the entity 120 with a particular account and with identifier data identifying entity 120 from among other entities and/or other accounts.

Following authentication 204, entity 120 may navigate to customization UI 112 (action 206). At customization UI 112, the entity 120 may provide data indicating invoice settings, such as data identifying financial software used by the entity 120, version numbers, file formats, etc. The customization UI 112 may save the customization settings (e.g., the invoice settings provided by the entity 120 during registration) with the E-invoice customization component 128 (action 208) and/or with data store 144 configured in communication with E-invoice customization component 128. Additionally, the entity 120 may use the customization UI 112 to view and/or change the current customization settings (action 210) for the entity 120.

Subsequently, entity 120 may send a purchase order 212 to e-commerce service 202 (e.g., to order goods and/or services) using the e-commerce service 202. The e-commerce service 202 may process the order and/or perform a tax workflow to determine the relevant taxes applicable to the order (action 214) by sending the purchase order (and/or the relevant data from the purchase order) to the tax workflow 124.

In various examples, the tax workflow 124 may send the purchase order data and the tax data (e.g., in the form of non-customized e-invoice data) to the e-invoice customization component 128 (action 216). In response the e-invoice customization component 128 may perform a lookup of the relevant customizations (e.g., previously stored invoice settings for the entity 120) using the account ID and/or the entity ID (e.g., identifier data) of the entity 120. The e-invoice customization component 128 may apply the invoice settings (customizations) to transform the non-customized e-invoice data into e-invoice data that is customized in accordance with the previously-stored invoice settings for entity 120. Thereafter, the e-invoice customization component 128 may send the customized e-invoice back to entity 120 for automatic ingestion and/or processing by systems of entity 120 (action 218).

FIG. 3 is an example of a user interface 300 that may be used as part of an e-invoice customization system, in accordance with various aspects of the present disclosure. User interface 300 may be an example of a portion of the customization UI 112 through which entity 120 may register, select, and/or override electronic invoice settings.

In the example user interface 300, header level 320 is selected. Accordingly, various header data customizations are displayed for customized electronic invoice data generation. In various examples, the various invoice settings that are displayed by default may be those invoice settings that are predicted for the current entity 120 based on a similarity to historical invoice settings of other entities. In an example, each invoice setting may be predicted using a binary classifier model. In the example user interface 300, there is a description 302 of a "From Credential Domain" along with code 304 displaying an implementation of the From Credential Domain according to the current invoice setting for the From Credential Domain. In the example, the From Credential Domain field in the electronic invoice displays the senders NetworkID (e.g., the first byte of the IP address of the sender).

In another example displayed in FIG. 3, the "To Credential Domain" displays the NetworkID 310 of the buyer (e.g., entity 120). However, the override button 308 (the "change" hyperlink) may be used to generate an override input that may be effective to select a different invoice setting in place of the NetworkID 310 of the buyer. Accordingly, it may be predicted (e.g., using a binary classifier) that the entity 120 may want to have the e-invoice display the NetworkID 310 of the entity 120 in the "To Credential Domain" field. However, if the entity 120 instead prefers something else be displayed in this field, the entity 120 may select the override button 308 and may select the desired data (e.g., from a list of invoice settings) for display in the "To Credential Domain" field. As shown in FIG. 3, tabs 312, 314 may be used to customize electronic invoice generation and electronic credit memo generation. User interface 300 may be used to review the entity 120's current invoice settings and/or modify the current invoice settings. For example, if backend accounting software used by entity 120 is changed (e.g., to different software and/or a different version) invoice settings may be changed in user interface 300 (or, more generally, customization UI 112) to continue to allow the backend accounting software to automatically ingest and/or process the customized electronic invoices generated by the e-invoice customization system 100.

Figure 4:
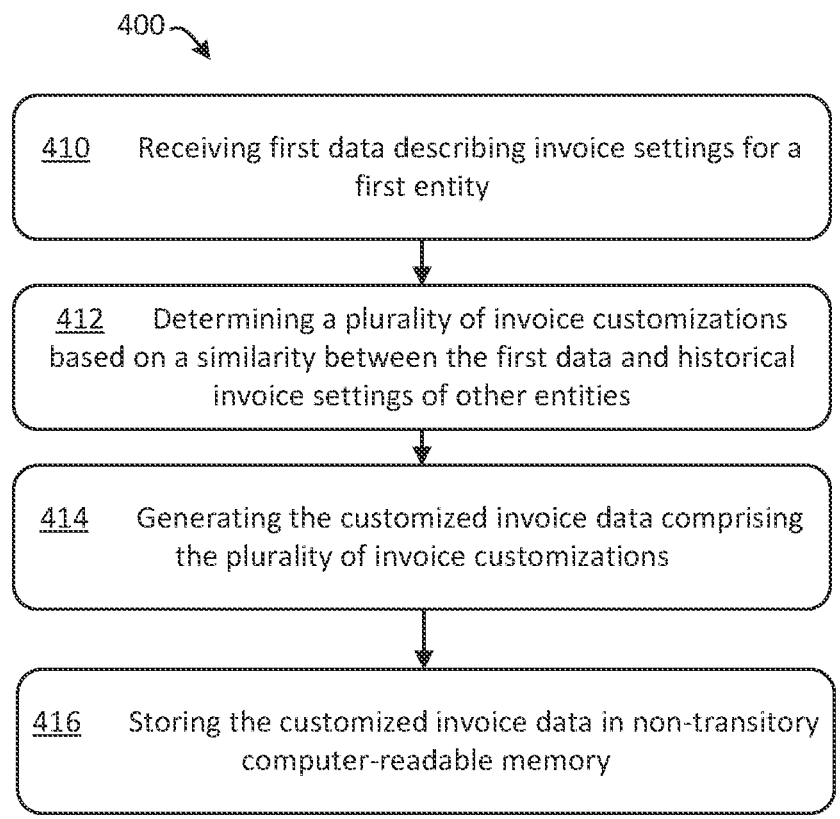
FIG. 4 is an example process that may be used to generate customized e-invoice data, in accordance with various aspects of the present disclosure.

FIG. 4 is a flow diagram depicting an example process 400 that may be used to generate customized e-invoice data, in accordance with various aspects of the present disclosure. Those actions in FIG. 4 that have been previously described in reference to FIGS. 1-3 may not be described again herein for purposes of clarity and brevity. The actions of the process depicted in the flow diagram of FIG. 4 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 400 may begin at action 410, at which first data describing invoice settings for a first entity may be received. In various examples, the invoice settings may be provided in response to prompts generated by the e-invoice customization system 100. The purpose of such prompts and/or of providing the first data describing invoice settings may be for the e-invoice customization system 100 to learn about entity 120 in order to predict the appropriate customizations and/or invoice requirements of the entity 120. For example, the customization UI 112 may prompt the entity 120 to provide a file format in which the customized electronic invoice data should be generated. In another example, the customization UI 112 may prompt the entity 120 to provide information about various backend systems used to ingest and/or process received invoices. For example, the customization UI 112 may provide a list of various types of software whereby the entity 120 may select the appropriate software and/or software version. In some other examples, information about the entity itself may be provided (e.g., data indicating a country in which the entity does business).

Processing may continue at action 412, at which a plurality of invoice customizations may be determined based on a similarity between the first data and historical invoice settings of other entities. At action 412, a feature representation (e.g., a customization profile) of the entity 120 may be determined based on the first data received at action 410. The feature representation may be a vector representing the various e-invoice requirements of the entity 120. Thereafter, a nearest neighbor algorithm (e.g., the k-nearest neighbor algorithm (kNN)) may be used to determine the most similar historical invoice settings (e.g., from other entities) to those submitted by entity 120 at action 410. The plurality of invoice customizations determined at action 412 may be predicted as the invoice settings that the entity 120 would like to use, based on the similarity between the invoice requirements provided by entity 120 as the first data of action 410 and the historical invoice settings.

Processing may continue to action 414, at which the customized invoice data may be generated comprising the plurality of invoice customizations. At action 414, the invoice customizations that were selected for the entity 120 (e.g., through prediction and/or via manual selection by the entity 120) may be generated as a data file representing the customized invoice data. Processing may continue to action 416, at which the customized invoice data may be stored in non-transitory computer-readable memory in association with identifier data (e.g., account data) representing the entity. Thereafter, the identifier data may be used to retrieve the customized invoice data when an invoice is to be generated for the entity 120.

Figure 5:
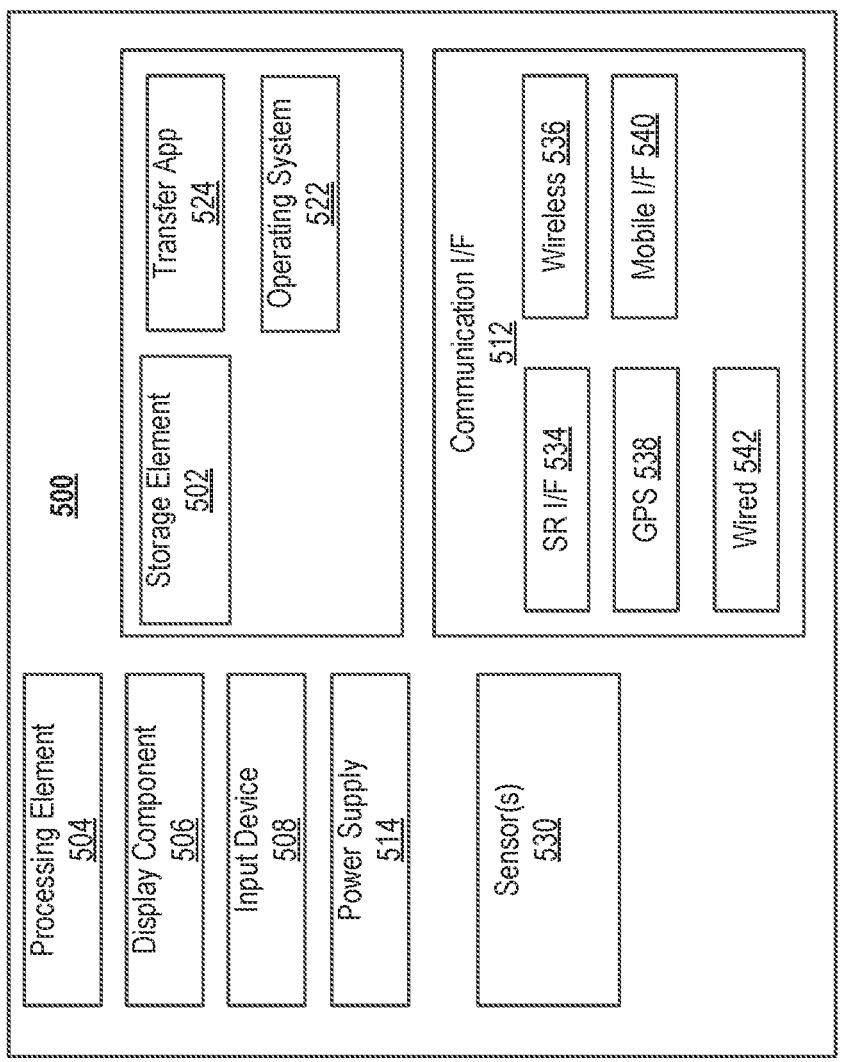
FIG. 5 is a block diagram showing an example architecture of a computing device that may be used in accordance with various embodiments described herein.

FIG. 5 is a block diagram showing an example architecture 500 of a computing device that may be used to generate customized e-invoice data, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store parameters, and/or machine learning models used for the various techniques described herein.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, video, and/or other data (e.g., invoice data, transaction data, etc.) from another device (e.g., a mobile device, image capture device, and/or display device) or from an image sensor and/or microphone included in the architecture 500.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display the various fields and/or GUIs described herein.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone or an array of microphones for capturing sounds, such as voice requests. In various examples, audio captured by a microphone may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors.

As noted above, multiple devices may be employed in a single system. In such a multi-device system, each of the devices may include different components for performing different aspects of the system's processing. The multiple devices may include overlapping components. The components of the computing devices, as described herein, are exemplary, and may be located as a stand-alone device or may be included, in whole or in part, as a component of a larger device or system.

Figure 6:
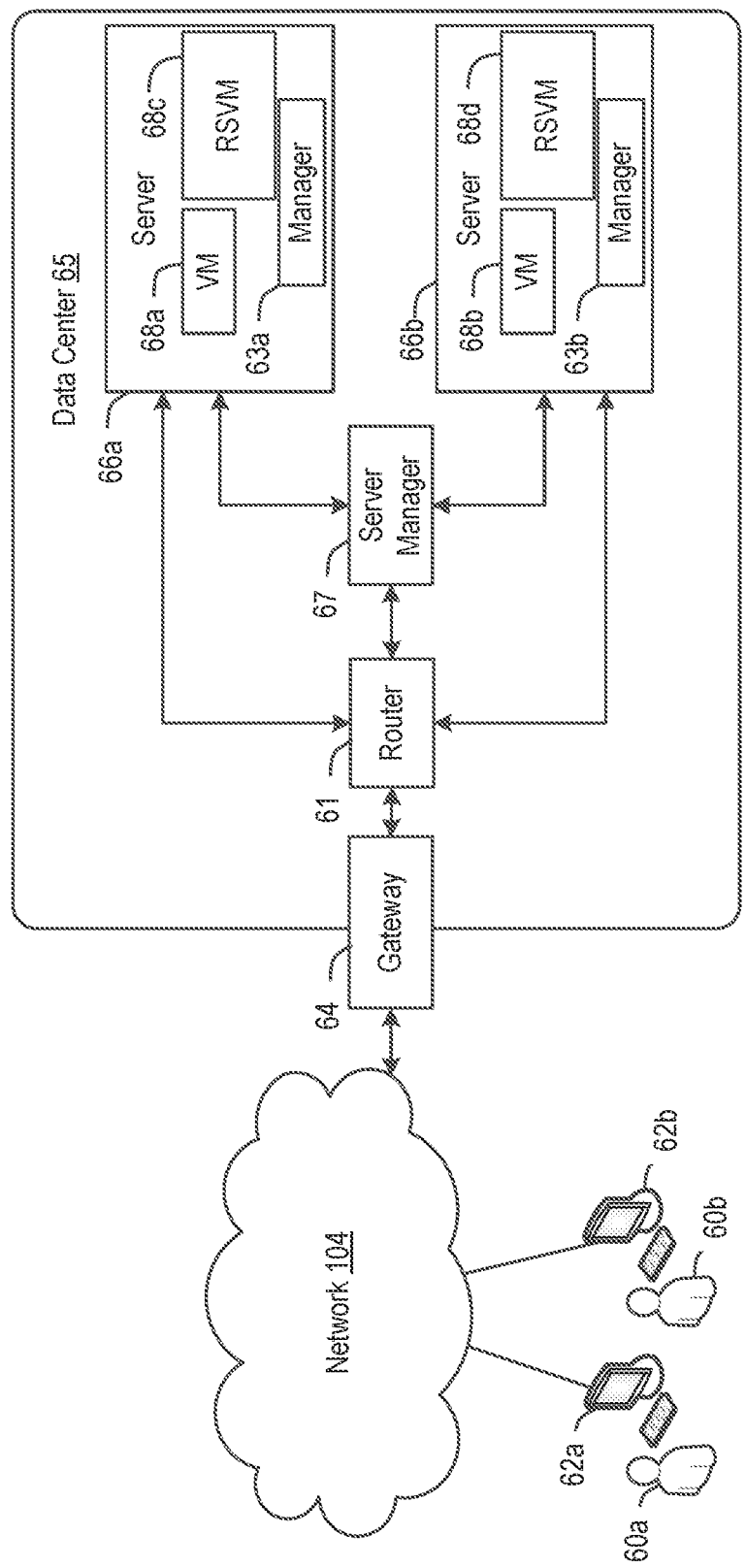
FIG. 6 is a diagram illustrating an example system for sending and providing data that may be used in accordance with the present disclosure.

An example system for sending and providing data will now be described in detail. In particular, FIG. 6 illustrates an example computing environment in which the embodiments described herein may be implemented. For example, the computing environment of FIG. 6 may be used to provide the various customized e-invoice generation techniques described herein as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services, and the like. In various examples, the instances may be configured to execute one or more of the various machine learning techniques described herein.

These services may be configurable with set or custom applications and may be configurable in size, execution, cost, latency, type, duration, accessibility, and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large-scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box, or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed, at least in part, to direct various communications to, from, and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location, or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities.

Figure 7:
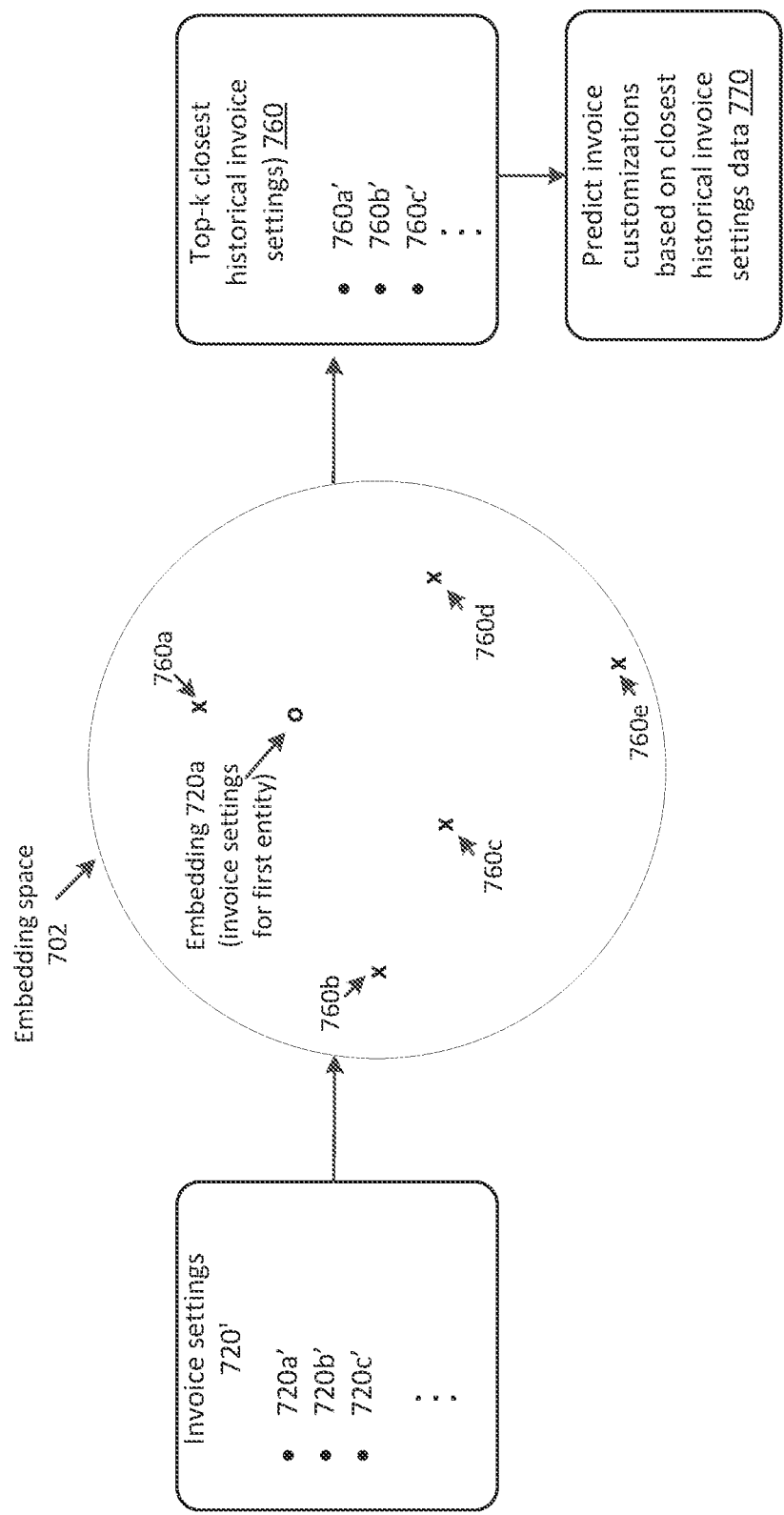
FIG. 7 is a diagram illustrating an example of prediction of invoice customizations based on historical data, in accordance with various aspects of the present disclosure.

FIG. 7 is a diagram illustrating an example of prediction of invoice customizations based on historical data, in accordance with various aspects of the present disclosure. Each of the invoice settings 720' (including invoice settings 720a', 720b', 720c', etc.) may be part of a customization profile of entity 120 and may be input into a machine learning model trained to generate individual embedding data in embedding space 702 (an n-dimensional embedding space). The embedding space 702 includes embedding for historical invoice settings generated by other entities.

In the example shown in FIG. 7, embeddings 760a, 760b, 760c, 760d represent embeddings of invoice settings for previously registered entities. In various examples, invoice settings 720a', 720b', 720c', etc., may be input into the machine learning model. The machine learning model may be trained to generate embeddings for each of the input invoice settings 720. In the example shown in FIG. 7, the embedding 720a has been generated for the invoice setting 720a'. Accordingly, the embedding 720a may represent the invoice setting 720a' as a vector of numbers pertaining to the n-dimensional embedding space for which the particular embedding model (e.g., an RNN) has been trained.

The top-k closest invoice settings 760 (for a given input invoice setting and/or customization profile) may be determined. In the example shown in FIG. 7, k may be four, although it should be appreciated that k may any value. Accordingly, in the illustrative example depicted in FIG. 7, the top-4 closest invoice settings 760 (for the input invoice setting 720a') are 760a' (an invoice setting corresponding to embedding 760a), 760b' (an invoice setting corresponding to embedding 760b), 760c' (an invoice setting corresponding to embedding 760c), and 760d' (an invoice setting corresponding to embedding 760d). In the example, the "closest invoice settings" are those with an embedding that is among the top 4 smallest distances (e.g., cosine distance, Euclidean distance, etc.) from the embedding 720a for invoice setting 720a' in the embedding space 702. In the example, the embedding 760a is the closest embedding in the embedding space 702 to the embedding 720a (representing the input invoice setting and/or customization profile). Accordingly, the invoice setting 760a' may be predicted for entity 120 based on the entity 120's specification of invoice setting 720a'. For example, at action 770 invoice customizations (e.g., invoice settings) may be predicted based on the closest historical invoice settings data. For example, a linear layer or other binary classifier may be used to predict whether to use the same invoice setting as the closest historical invoice settings data. For example, for the invoice setting corresponding to invoice setting 720a'.

Although various systems described herein may be embodied in software or code executed by general-purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. In addition, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method of generating customized invoice data comprising:
   receiving, by a first computing device, first data describing invoice settings for a first entity;
   determining, using a first machine learning model, first embedding data representing the invoice settings for the first entity;
   updating parameters of the first machine learning model using a first difference between the first embedding data and second embedding data representing first annotated training data, wherein the second embedding data comprises vector representations of historical invoice settings for other entities;
   determining, by the first computing device, a similarity between the first embedding data and the historical invoice settings of the other entities using the first embedding data;
   determining, by a second machine learning model of the first computing device, a first invoice customization based on the similarity;
   determining a second difference between the first invoice customization and second annotated training data;
   updating parameters of the second machine learning model using the second difference;
   generating customized invoice data comprising the first invoice customization; and
   sending the customized invoice data to a second computing device.

2. The method of claim 1, further comprising:
   receiving a purchase order from the first entity;
   retrieving the customized invoice data from non-transitory computer-readable memory; and
   generating an electronic invoice for the purchase order using the customized invoice data.

3. The method of claim 1, further comprising:
   displaying the first invoice customization of a plurality of invoice customizations during a registration process; and
   receiving an override input from the first entity, wherein the override input indicates a selection of a second invoice customization overriding the first invoice customization, wherein the customized invoice data comprises the second invoice customization in place of the first invoice customization.

4. The method of claim 3, further comprising:
   generating second data representing the override input; and
   training the first machine learning model effective to predict the first invoice customization based on the similarity between the first data and the historical invoice settings from the other entities using the second data.

5. The method of claim 1, wherein the first data comprises specification of a software type and version used by the first entity to process received invoices.

6. The method of claim 1, wherein the first data comprises a file format for electronic invoices for the first entity.

7. The method of claim 1, wherein the determining the first invoice customization comprises determining the similarity between the first data and the historical invoice settings using a k-nearest neighbor algorithm to determine the similarity in a multi-dimensional feature space.

8. The method of claim 1, further comprising:
   receiving, from the first entity, a purchase order;
   generating tax data for the purchase order;
   determining identifier data identifying the first entity from the purchase order;
   retrieving the customized invoice data for the first entity using the identifier data;
   generating an electronic invoice for the purchase order using the tax data and the customized invoice data; and
   sending the electronic invoice to the first entity.

9. A system comprising:
   at least one processor;
   non-transitory computer-readable memory storing instructions that, when executed by the at least one processor, are effective to:
   receive first data describing invoice settings for a first entity;
   determine, using a first machine learning model, first embedding data representing the invoice settings for the first entity;
   update parameters of the first machine learning model using a first difference between the first embedding data and second embedding data representing first annotated training data;
   determine a similarity between the first embedding data and historical invoice settings of other entities using the first embedding data;
   determine, by a second machine learning model, a first invoice customization based on the similarity;
   determine a second difference between the first invoice customization and second annotated training data;
   update parameters of the second machine learning model using the second difference;
   generate customized invoice data comprising the first invoice customization; and send the customized invoice data to a second computing device.

10. The system of claim 9, the non-transitory computer-readable memory storing further instructions that, when executed by the at least one processor, are further effective to:
receive a purchase order from the first entity;
retrieve the customized invoice data from the non-transitory computer-readable memory; and
generate an electronic invoice for the purchase order using the customized invoice data.

11. The system of claim 9, the non-transitory computer-readable memory storing further instructions that, when executed by the at least one processor, are further effective to:
display the first invoice customization of a plurality of invoice customizations during a registration process; and
receive an override input from the first entity, wherein the override input indicates a selection of a second invoice customization overriding the first invoice customization, wherein the customized invoice data comprises the second invoice customization in place of the first invoice customization.

12. The system of claim 11, the non-transitory computer-readable memory storing further instructions that, when executed by the at least one processor, are further effective to:
generate second data representing the override input; and
train the first machine learning model effective to predict the first invoice customization based on the similarity between the first data and the historical invoice settings from other entities using the second data.

13. The system of claim 9, wherein the first data comprises specification of a software type and version used by the first entity to process received invoices.

14. The system of claim 9, wherein the first data comprises a file format for electronic invoices for the first entity.

15. The system of claim 9, wherein the determining the first invoice customization comprises determining the similarity between the first data and the historical invoice settings using a k-nearest neighbor algorithm to determine the similarity in a multi-dimensional feature space.

16. The system of claim 9 the non-transitory computer-readable memory storing further instructions that, when executed by the at least one processor, are further effective to:
receive, from the first entity, a purchase order;
generate tax data for the purchase order;
determine identifier data identifying the first entity from the purchase order;
retrieve the customized invoice data for the first entity using the identifier data;
generate an electronic invoice for the purchase order using the tax data and the customized invoice data; and
send the electronic invoice to the first entity.

17. A method comprising:
receiving, by a first computing device, first data describing invoice settings for a first entity;
determining, using a first machine learning model, first embedding data representing the invoice settings for the first entity;
updating parameters of the first machine learning model using a first difference between the first embedding data and second embedding data representing first annotated training data;
determining, by the first computing device, a similarity between the first embedding data and historical invoice settings of other entities using the first embedding data;
determining, by a second machine learning model of the first computing device, a first invoice customization based on the similarity;
receiving an override input from the first entity specifying a second invoice customization;
updating parameters of the second machine learning model based on a difference between the first invoice customization and the second invoice customization;
generating customized invoice data based at least in part on the override input; and
sending the customized invoice data to a second computing device.

18. The method of claim 17, further comprising:
receiving a purchase order from the first entity;
retrieving the customized invoice data from non-transitory computer-readable memory; and
generating an electronic invoice for the purchase order using the customized invoice data.

19. The method of claim 17, further comprising:
generating second data representing the override input; and
updating the parameters of the second machine learning model based on a difference between the second data and third data representing the first invoice customization.

20. The method of claim 17, wherein the first data comprises specification of a software type and version used by the first entity to process received invoices.

* * * * *